United States Patent
Stirling-Gallacher

(10) Patent No.: US 6,625,201 B1
(45) Date of Patent: Sep. 23, 2003

(54) COHERENT RECEIVER WITH CHANNEL ESTIMATOR

(75) Inventor: Richard Stirling-Gallacher, Fellbach (DE)

(73) Assignee: Sony International (Europe) GmbH, Berlin (DE)

(*) Notice: Subject to any disclaimer, the term of this patent is extended or adjusted under 35 U.S.C. 154(b) by 0 days.

(21) Appl. No.: 09/415,889

(22) Filed: Oct. 8, 1999

(30) Foreign Application Priority Data

Oct. 12, 1998 (EP) .............................................. 98119226

(51) Int. Cl.[7] .............................................. H04B 1/69
(52) U.S. Cl. ...................................... 375/144; 375/229
(58) Field of Search .............................. 375/144, 150, 375/147, 284, 285, 229–232, 316, 340, 343, 346, 348

(56) References Cited

U.S. PATENT DOCUMENTS 5,677,930 A * 10/1997 Bottomley .................. 375/150
5,822,380 A * 10/1998 Bottomley .................. 375/347

FOREIGN PATENT DOCUMENTS

EP    0 526 439    2/1993
EP    0 849 886    6/1998

* cited by examiner

*Primary Examiner*—Chi Pham
*Assistant Examiner*—Kevin M. Burd
(74) *Attorney, Agent, or Firm*—Frommer Lawrence & Haug LLP; William S. Frommer; Darren M. Simon

(57) ABSTRACT

The invention relates to an improved channel estimation technique for coherent CDMA systems. Traditionally channel estimators for coherent CDMA systems are based on a correlator. However, channel estimators based on this traditional approach are subject to the effect interpath interference, which caused performance to be degraded.

Figure 1:
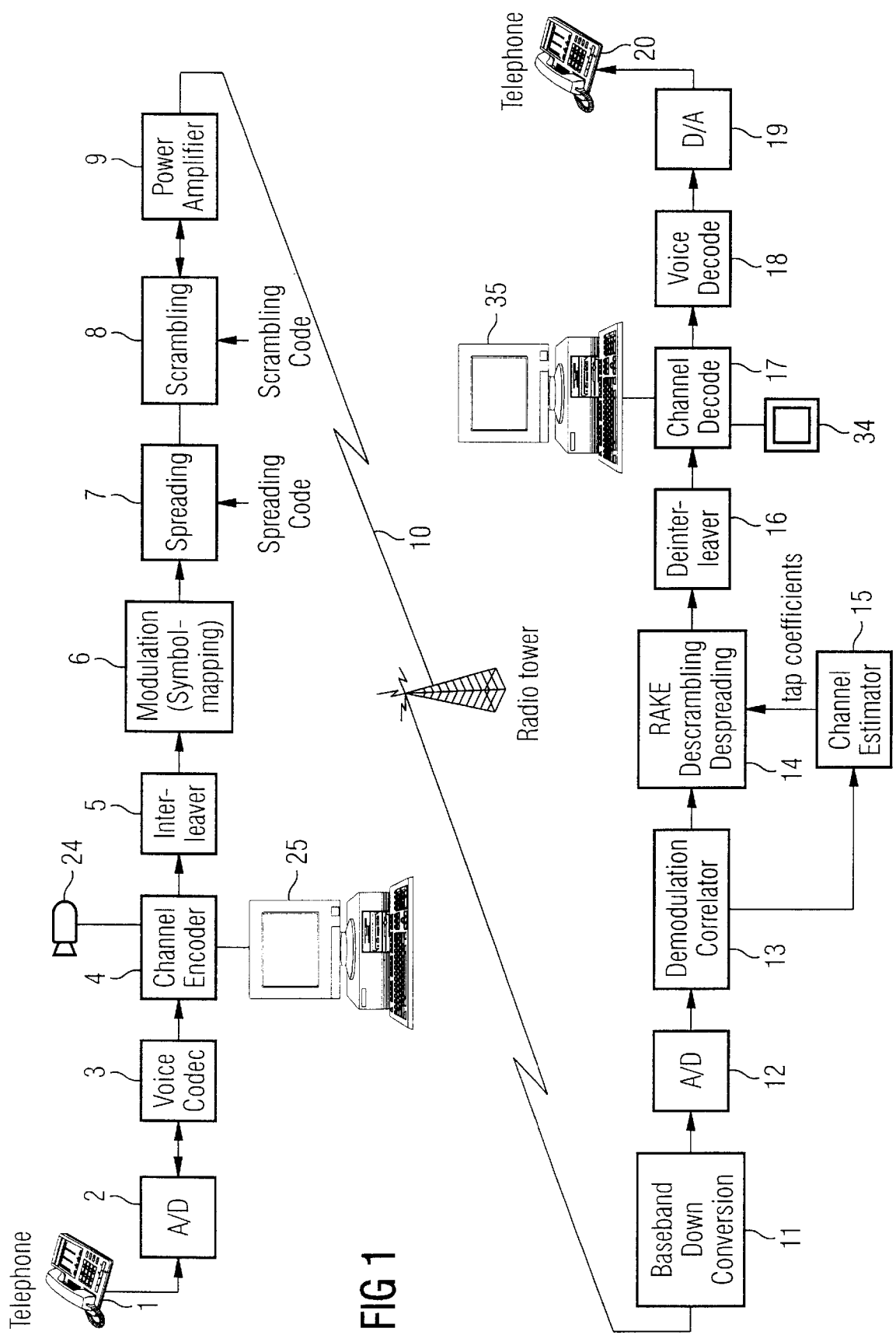

The CDMA channel estimation technique eliminates the effects of interpath interference by using a cancellation technique. Therefore, estimate values output from a path searcher (30) respectively passed through a scaling unit (31) and a cross correlation calculator (32). The cross correlation term can be easily calculated since the path delay and the spreading sequence are known at the receiving side. The output signals of the cross correlation calculator (32) are respectively subtracted from the original estimation value $\hat{\alpha}_0$ in a subtracting unit (33) to generate an improved estimation value to be supplied to an input terminal (27) of a RAKE combiner (26).

17 Claims, 4 Drawing Sheets

COHERENT RECEIVER WITH CHANNEL ESTIMATOR

The present invention relates to a coherent receiver and a coherent receiving method comprising an improved channel estimation technique.

Traditionally channel estimators for example for coherent CDMA systems are based on a correlator. However, channel estimators based on this traditional approach are subject to the effects of interference, which causes performance to be degraded.

Traditionally channel estimates for coherent CDMA systems are based on a cyclic correlator (or a taped delay line). The incoming received chip stream is correlated by all of the different cyclic shifts of the correlator. The cyclic shifts which produce the n strongest correlator outputs are selected to be used by the n tap RAKE receiver. The delays corresponding to the n cyclic shifts correspond to the n estimated path delays, whereas the n chosen complex correlator outputs correspond to the amplitudes and phases of the n paths.

However, by using a cyclic correlator, the channel estimates are subject to interpath interference, which degrades the quality of the channel estimate.

From U.S. Pat. No. 5,677,930 a method and apparatus for spread spectrum channel estimation is known. Said apparatus comprises a receiver which demodulates CDMA signals using estimates of channels coefficients. Code division multiple access (CDMA) is a channel access technique which allows signals to overlap in both time and frequency. CDMA therefore is a type of spread spectrum communications. In a CDMA system, each signal is transmitted using spread spectrum techniques. In principle, the informational data stream to be transmitted is impressed upon a much higher rate data stream known as a signature sequence. One way to generate the signature sequence is with a pseudo-noise (PN) process that appears randomly, but can be replicated by an authorized receiver.

The informational data stream and the higher bit rate signature sequence stream are combined by multiplying the two streams together. This combination of the higher bit rate signal and the lower bit rate data stream is called spreading the information data stream signal. Each information data stream or channel is allocated a unique signature sequence.

Traditionally, a signature sequence is used to represent one bit of information. Receiving the transmitted sequence or its compliment indicates whether the information bit is +1 or −1. The signature sequence usually comprises L bits and each bit of the signature sequence is called a chip. The entire L chip sequence or its compliment is referred to as a transmitted symbol. The conventional receiver, e.g. a RAKE receiver, correlates the received signal with the complex conjugate of the known signature sequence to produce a correlation value. As already set forth, the conventional RAKE receiver performs well provided several conditions or satisfied. The first condition is that the autocorrelation function of the signature sequence is ideal in that the signature sequence is uncorrelated with a shift of itself. If this is not true, then the different signal rays interfere with one another which is referred to as self-interference. For example multipath propagation destroys the orthogonality of Walsh codes often used as so called spreading codes or scrambling codes. The second condition is that the cross-correlation between the signature sequence of the desired signal and various shifted versions of the signature sequences of the other CDMA signal is 0. If this is not true, then the other CDMA signals interfere with the desired CDMA signal. This can be particularly significant when the other CDMA signal has a much higher power than the desired power CDMA signal. The third condition is that the interference caused by an echo of one transmitted symbol overlapping with the next transmitted symbol should be negligible. If this is not true, then the transmitted symbols interfere with past and future transmitted symbols, which is commonly referred to as intersymbol interference.

U.S. Pat. No. 5,677,930 thereby discloses a technique for estimating channel coefficients that eliminate the problem of self-interference in a CDMA system. According to said known technique the elimination of self-interference is accomplished by decorrelating the correlation values with respect to one another. Decorrelation is performed by multiplying an inverse of a matrix including autocorrelation function values with a vector of received bits correlated with a signature sequence associated with said autocorrelation function. As the known technique uses a matrix approach to solve the interpath interference problem, said approach is very complicated and its complexity grows exponentially with a number of multipath components.

Therefore it is the object of the present invention to provide for an improved channel estimation technique which is less complicated and less complex. For example, the complexities should only grow linearly with a number of multipath components.

Therefore it is the object to provide a channel estimation technique which eliminates the effects of interpath interference and provides better channel estimates, hence producing better receiving performance. The object of the present invention is achieved by means of the features of the independent claims. The dependent claims develop further the central idea of the present invention.

Therefore, according to the present invention, a coherent receiver comprising a correlator for correlating a received bit stream is provided. A channel estimator estimates tap coefficients on the basis of an output signal of the correlator. The channel estimator thereby comprises interference cancellation means for eliminating interference components in the output signal of the correlator. A detector detects information symbols on the basis of the output signal of the correlator and the estimation tap coefficients. According to the present invention, the interference cancellation means comprise respectively for each estimation tap coefficient means for calculating interference components and means for subtracting interference components from an estimated tap coefficient to generate and improve an estimated coefficient to be supplied to the detector.

The means for calculating interference components can comprise cross-correlation calculation means.

The means for calculating interference components comprise scaling means for scaling the input of the cross-correlation calculation means by the number L of chips constituting one symbol of the received bit stream.

The channel estimator furthermore can comprise further cancellation means (additional cancellation stages) for eliminating interference components in the output of the first cancellation means.

The detector can comprise at least one RAKE receiver.

The interference cancellation means can be designed to cancel interpath interference components.

The channel estimator can comprise a path search means to detect the n strongest multipath component with an amplitude larger than a predetermined threshold, n being a preset integer.

According to the present invention furthermore a mobile telecommunications device comprising a coherent receiver as set forth above is provided.

According to the present invention furthermore a mobile station for a CDMA transmission system is provided comprising a coherent receiver as set forth above.

Furthermore, a coherent receiving method is provided according to which a modulated bit stream is received: The received bit stream is correlated. On the basis of an output of the correlating step tap coefficients are estimated. The tap coefficients estimating step comprises the step of interference cancellation for eliminating interference components in the output of the correlating step. Information symbols are detected on the basis of the output of the correlating step and the estimation tap coefficients. According to the present invention the interference cancellation step comprises respectively for each estimation step coefficient a step of calculating interference components and a step of subtracting interference components from an estimated tap coefficient to generate an improved estimated tap coefficient to be used in the detecting step.

The step of calculating interference components can comprise a cross-correlation calculation step and the step of scaling the input of the cross-correlation calculation step by the number L of chips constituting one symbol of the received bit stream, L being an integer.

The estimating step can further comprise the step of eliminating interference components in the output of the first cancellation means.

The detecting step can comprise at least one RAKE receiving step.

The interference cancellation step cancels interpath interference components.

The channel estimating step can comprise a path-searching step detecting the n strongest multipath components with an amplitude larger than a predetermined threshold, n being a preset integer.

The received bit stream can modulate according to a CDMA technique.

In the following further details, particularities and advantages of the present invention will come clearer from an explanation of embodiments of the present invention taken in conjunction with the figures of the enclosed drawings. In the drawings identical reference signs denote similar or identical components.

Figure 2:
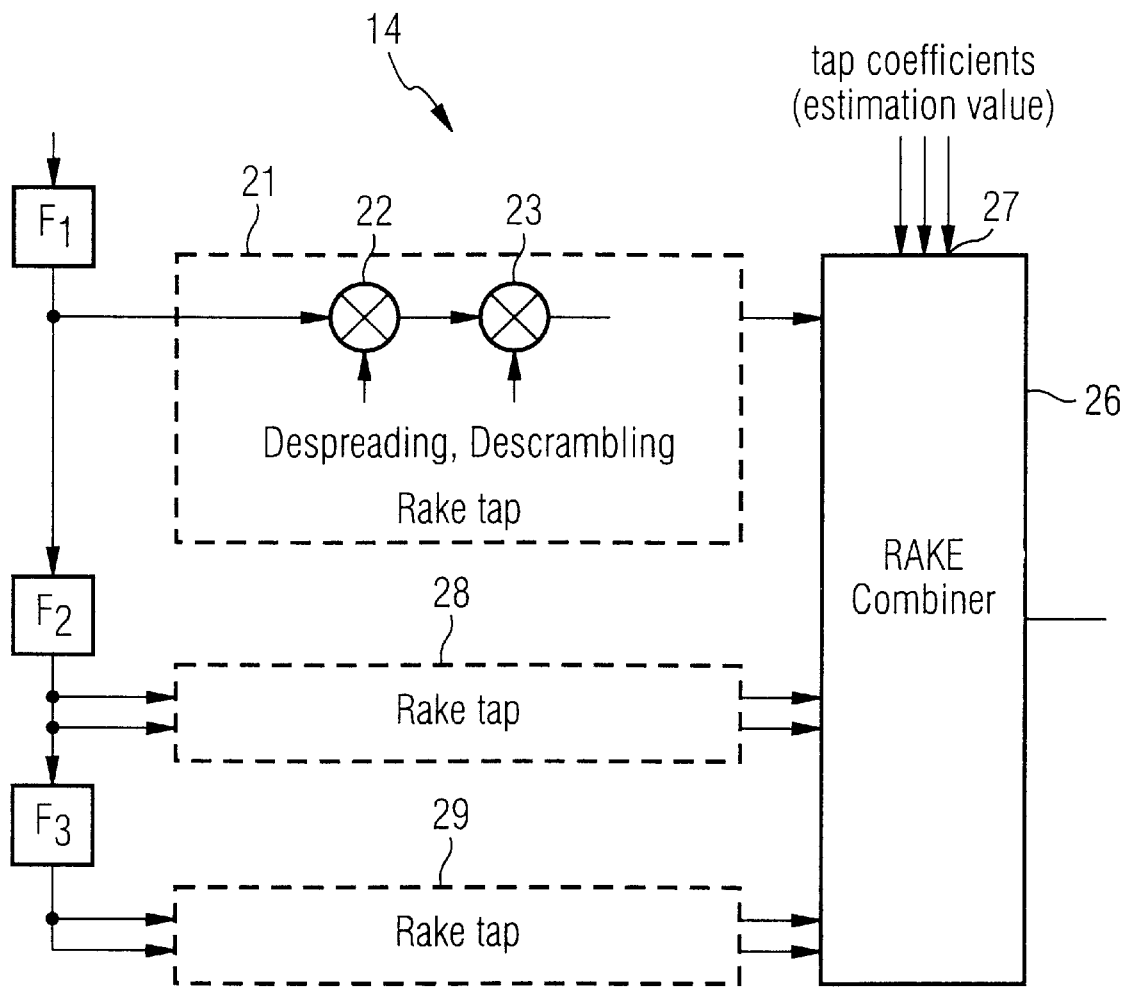
Figure 3:
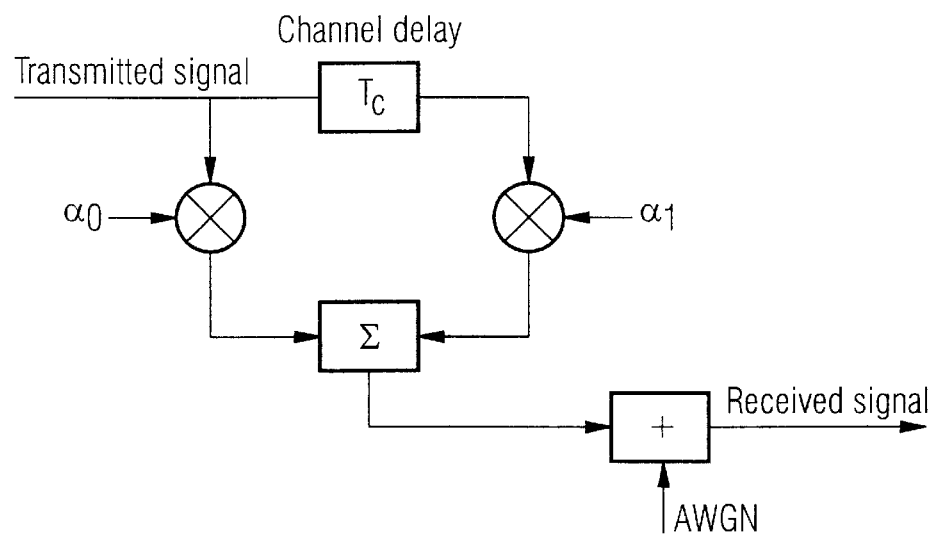
Figure 4:
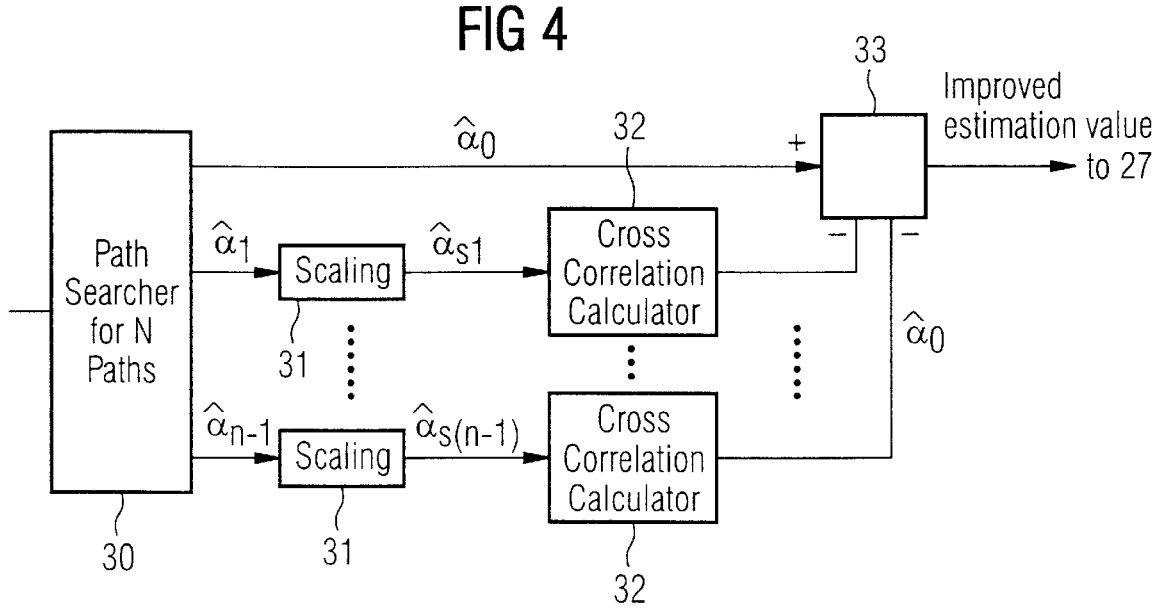
Figure 5:
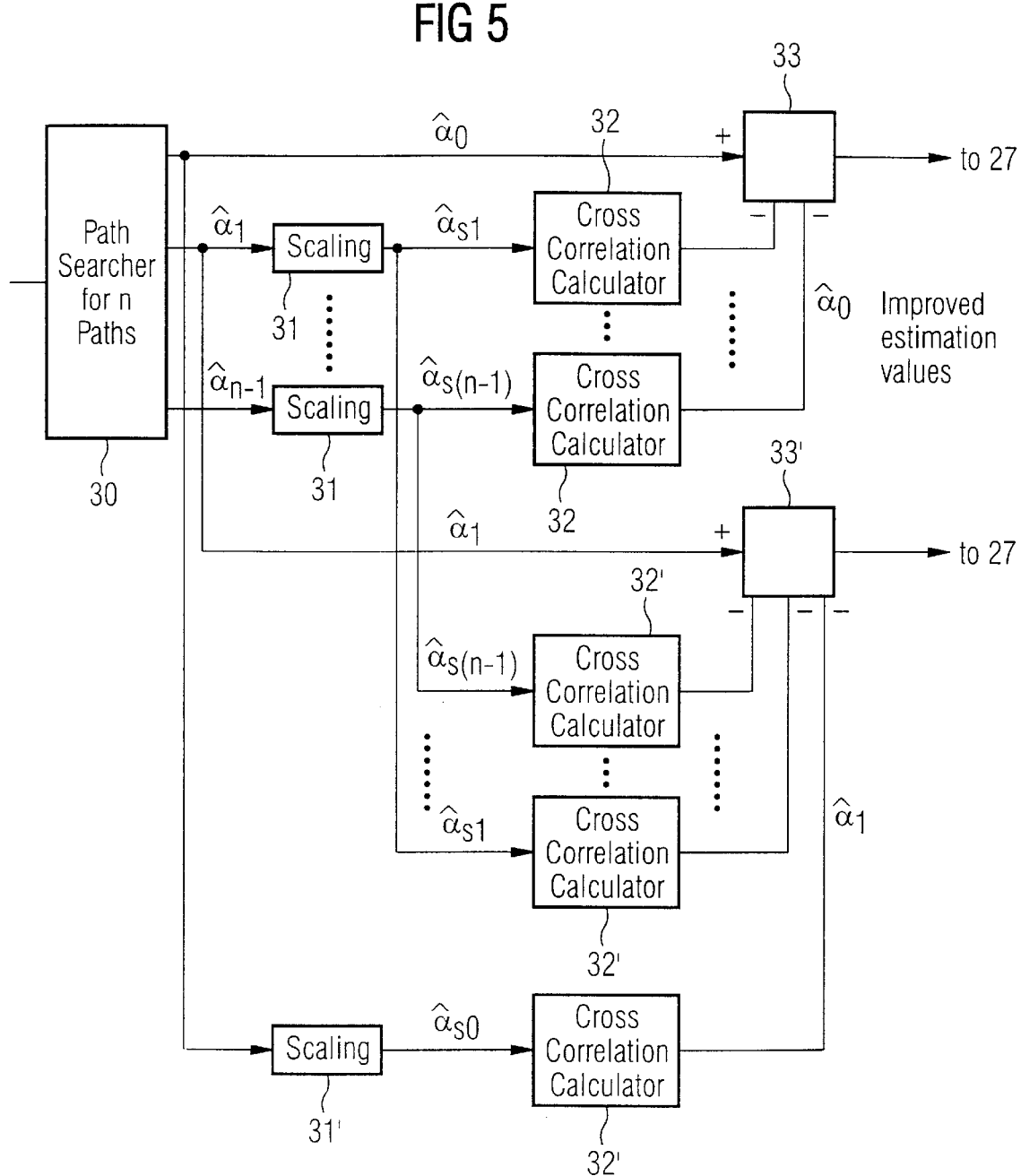

FIG. 1 shows the incorporation of a coherent receiving technique according to the present invention in a CDMA transmission chain, FIG. 2 shows the internal structure of a RAKE receiver, FIG. 3 shows a simulation of multipath propagation, FIG. 4 shows a channel estimator according to the present invention, and FIG. 5 shows a further channel estimator according to the present invention.

With reference to FIG. 1 an application of the principles of the present invention in a CDMA transmission chain will be explained. Any kind of data, such as video data from a digital video camera 24, data from a computer 25 or voice data from a telephone 1 can be transmitted. In the case of the telephone 1, the analog voice data are passed through a A/D converter 2. After being passed through a voice coder 3 and a channel encoder 4, the digital data from the A/D converter 2 are interleaved in an interleaving unit 5. After modulation by a symbol mapper 6 the modulated data are spread by means of a multiplication with a spreading code in a spreading unit 7. Then the spread data output from the spreading unit 7 are scrambled by being multiplied with the scrambling code in a scrambling unit 8. The scrambled data output from the scrambling unit 8 are power-amplified in an power amplifier 9 and transmitted over an air interface 10.

On the receiving side, the received data bit stream is downconverted in a baseband downconvertor 11. The downconverted data output from the baseband downconvertor 11 are digitized in an A/D converter and input to a demodulating and correlating unit 13. The correlator in the demodulating/correlating unit 13 can be a cyclic correlator or a taped delay line. The incoming received chip stream is correlated by the demodulating/correlating unit 13 by all of the different cyclic shifts of the correlator. By means of the correlation the correlator detects correlation peaks representing delays corresponding to estimated path delays $\tau 1$, $\tau 2, \tau 3$ of a multipath propagation channel. The amplitudes of the detected correlation peaks represent the amplitudes and phases of the estimated paths. The output signals of the demodulating/correlating unit 13 are both supplied to a channel estimator 15, which will be explained in detail later on, and a descrambling/despreading unit comprising at least one RAKE receiver 14. The descrambling/despreading unit 14 comprising at least one RAKE receiver is supplied with estimated tap coefficients (channel estimates) from the channel estimator 15, which will be explained later on with reference to FIG. 2. The output of the RAKE receiver in the descrambling/despreading unit 14 is passed through a deinterleaver 16, a channel decoder 17, a voice decoder 18 and is then D/A converted in a D/A converter 19. Finally the analog data is output on a terminal such as a telephone 20. Obviously digital data can be supplied directly from the channel decoder 17 for example to a video monitor 34 or a computer terminal 35.

With reference to FIG. 2 now the principles of a RAKE receiver 14 will be explained. As it has already been explained the RAKE receiver 14 is supplied both with delay information $\tau 1, \tau 2, \tau 3$ corresponding to the position of the correlation peaks detected by the correlator 13 and tap coefficients (estimation values) from the channel estimator 15 input at an input terminal 27 of a RAKE combiner 26.

As shown in FIG. 2 the output signals of the correlator 13 are supplied with corresponding delay $\tau 1, \tau 2, \tau 3$ to a plurality of taps 21, 28, 29 of the RAKE receiver 14. Each of the RAKE taps 21, 28, 29 comprises multipliers 22 and 23 to multiply the input signal with despreading and descrambling codes, respectively. The output signals of the RAKE taps 21, 28, 29 are supplied to a RAKE combiner 26. In the RAKE combiner 26 the output signals from the RAKE taps 21, 28, 29 are respectively multiplied with estimated RAKE coefficients (normally complex conjugates of channel estimates) input at an input terminal 27 of the RAKE combiner 26. Then for example the products of the multiplying process are summed up and the sign of the resulting sum is taken giving a detected information bit value e.g. ±1.

As it comes clear from FIG. 2 the channel estimation process to generate the RAKE tap coefficients provided to the terminal 27 of the RAKE combiner 26 is crucial for the quality of the performance of the receiver. However, the estimation is influenced by different interference effects.

With reference to FIG. 3 interference effects in a multipath channel will now be explained. In the example of FIG. 3 two paths of a multipath channel are shown. The first path has no delay and the complex fading of this path is given by $\alpha_0$. (It is assumed that the fading of all paths is constant over the symbol time duration) The second part has a delay of $T_c$ corresponding to one chip delay and a complex fading of $\alpha_1$. Additive white gaussian noise (AWGN) is added to both of these parts as shown in FIG. 3.

For illustrative purposes we shall assume that a spreading sequence consisting of L chips (in this case we shall choose L=4) $c_0, c_1, c_2, c_3$ is transmitted and these are modulated by a known pilot data bit $b_0$. If a scrambling sequence is also used the set sequence $c_0$, $c_1$, $c_2$, $c_3$ are the transmitted chips after spreading and scrambling. (The previous data bit is $b_{-1}$ and the next bit is $b_1$). Each chip has a duration of $T_c$ seconds and chip $c_0$ is sent first. By ignoring the effects of noise the received signal for the different time instances is given by:

Time=0: Received signal=$b_0c_0\alpha_0+b_{-1}c_3\alpha_1$ (1)

Time=$T_c$: Received signal=$b_0c_1\alpha_0+b_0c_0\alpha_1$ (2)

Time=2 $T_c$: Received signal=$b_0c_2\alpha_0+b_0c_1\alpha_1$ (3)

Time=3 $T_c$: Received signal=$b_0c_3\alpha_0+b_0c_2\alpha_1$ (4)

Time=4 $T_c$: Received signal=$b_1c_0\alpha_0+b_0c_3\alpha_1$ (5)

Since the delay and complex fading of the different multipath fading components are not known at the receiver, a cyclic correlator is first used to establish which n delayed signals are the strongest. In this example the estimate for $\alpha_0$, denoted by $\hat{\alpha}_0$, is obtained by using the correlator sequence $c_0$, $c_1$, $c_2$, $c_3$ and multiplying this sequence by the received sequence for the first four time samples, $$\hat{\alpha}_0 = 4b_0\alpha_0 + \alpha_1 b_0(c_0c_1+c_1c_2+c_3c_2) + \alpha_1 b_{-1}(c_0c_3) \quad (6)$$

A scaled version of this is then also formed by dividing $\hat{\alpha}_0$ by the number L of chips of one symbol:

$$\hat{\alpha}_{s0} = \frac{\hat{\alpha}_0}{L} \quad (7)$$

The sequence $c_0$, $c_1$, $c_2$, $c_3$ is then multiplied by the last four samples to obtain the estimate for $\alpha_1$ denoted by $\hat{\alpha}_1$, $$\hat{\alpha}_1 = 4b_0\alpha_1 + \alpha_0 b_0(c_0c_1+c_1c_2+c_2c_3) + \alpha_0 b_1(c_3c_0) \quad (8)$$

A scaled version of this in then also formed by dividing $\hat{\alpha}_1$ by the number L of chips of one symbol:

$$\hat{\alpha}_{s1} = \frac{\hat{\alpha}_1}{L} \quad (9)$$

As can be seen, both of these estimates ($\hat{\alpha}_{s0}$, $\hat{\alpha}_{s1}$) are subject to two interference terms. The first interference term $\alpha_0\, b_0(c_0c_1+c_1c_2+c_2c_3)$ is due to the interpath interference and depends upon the autocorrelation of the spreading sequence. The second interference term $\alpha_0 b_1 (c_3 c_0)$ is due to intersymbol interference.

The output of the path searcher 30 (see FIG. 4) produces the first initial fading estimates of the multipath channel $\hat{\alpha}_0, \ldots \hat{\alpha}_{n-1}$ where n is the total number of multipath components to be resolve. Each of the unwanted channel estimates is then scaled 31 by the number L of chips of one symbol and multiplied by a cross correlation term 32. The cross correlation term for each path can be easily calculated, since the path delays and the spreading sequence are known at the receiver.

The operation effected by the structure shown in FIG. 4 can be expressed mathematically as, $$\tilde{\alpha}_0 = \frac{\hat{\alpha}_0 - \sum_{i=1}^{i=n-1} \hat{\alpha}_{s(i)} \sum_{x=0}^{x=L-1-delay_i} c_x c_{x+(delay_i)}}{Lb_0} \quad (10)$$

where n is the total number of paths to be resolved, L is the length of the spreading sequence (corresponding to the number of chips of one symbol) and $delay_i$ is the delay in units of chips of the i th multipath component. $\hat{\alpha}_{s(i)}$ is the scaled (normalized) channel estimate of $\hat{\alpha}_i$ given by, $$\hat{\alpha}_{s(i)} = \frac{\hat{\alpha}_i}{L} \quad (11)$$

This expression can be generalized for the m th improved channel estimate $\alpha_m$ $$\tilde{\alpha}_m = \frac{\hat{\alpha}_m - \sum_{\substack{i=1 \\ i \neq m}}^{i=n-1} \hat{\alpha}_{s(i)} \sum_{x=0}^{x=L-1-delay_i} c_x c_{x+(delay_i)}}{Lb_0} \quad (12)$$

It is possible to scale all of the improved channel estimates, although this is not required.

It is to be noted that the multipath example given above has multipath delay components spaced at multiples of $T_c$ (chip period). This approach was used to simplify the analysis. In situations when a multipath component is spaced in time at $T_i$ which is not a multiple of $T_c$ (chip period), the autocorrelation R(.) of the transmitter pulse is used in the cross correlation calculation the cross correlation terms in equations (10) and (12) are then modified to include the pulse autocorrelation term R(.), $$\sum_{x=0}^{x=L-1-delay_i} c_x c_{x+(delay_i)} R(t_i) \quad (13)$$

where $T_i=delay_i\, T_c+t_i$ $delay_i$, is an integer which represents the delay of the i-th multipath component in units of chips ($T_c$) and $t_i < T_c$.

The present invention is particularly directed on the cancellation of the first interference term (interpath interference term).

In FIG. 4 now an implementation of the present invention will be explained. In FIG. 4 it is shown how the interference can be removed from an estimate $\alpha_0$ to form an improved estimate value $\alpha_0$. Of course, the present invention covers also the aspect to apply the interpath interference canceller as shown in FIG. 4 to all of the channel estimates as it is generally shown in FIG. 5. The output from the correlator 13 is supplied to a path searcher for n paths 30. The path searcher detects n paths, i.e. n peaks of the correlator 13 satisfying a predetermined criterion, e.g. n paths exceeding a determined amplitude threshold value.

In FIG. 4 only one interference cancellation stage is shown. With other words, in the example as shown in FIG. 4 the outputs of the paths searcher 30 are respectively passed through a scaling unit 31, processed by a cross calculation correlator 32 and then the interference terms calculated by the scaling unit 31 and the cross calculation correlator 32 are subtracted in a subtracting unit 33 from the estimation value $\hat{\alpha}_0$ to generate an improved estimation value which, according to the embodiment of FIG. 4, is directly provided to the terminal 27 of the RAKE combiner 26. However, the improved estimation values output from the subtracting values 33 of the first cancellation stage shown in FIG. 4 can be further improved by being provided to several succeeding cancellation stages which are not shown in FIG. 4. The improved estimation value output from the subtracting unit 33 in FIG. 4 can furthermore be supplied to an intersymbol interference unit using knowledge of previous data bits $b_{-1}$ and $b_1$.

The general idea shown in FIG. 4 is to be applied on all channel estimates output by the path searcher 30(in FIG. 4 only the value $\hat{\alpha}_0$ is improved). As shown in FIG. 5 estimation values which have already been passed through an scaling unit 31 can be reused for the improvement of further estimation values (for example, $\hat{\alpha}_1$ in a taped manner). For interference cancellation of the estimation values $\hat{\alpha}_1$, further scaling units 31' in cross calculation correlators 32' are provided, wherein the output of the cross calculation correlator 32' is respectively subtracted from the original estimation value $\hat{\alpha}_1$ in a subtractor 33' to generate an improved estimation value $\alpha_1$.

According to the present invention the effects of interpath interference in a CDMA channel estimation technique are eliminated by using a cancellation technique.

The invention thereby has the following advantages over the state of the art to solve the interpath interference problems simplicity and the complexity grows only linearly with a number of multipath components.

What is claimed is:

1. Coherent receiver, comprising
a correlator (13) for correlating a received bitstream,
a channel estimator (15) for estimating tap coefficients on the basis of an output signal of the correlator (13), wherein the channel estimator (15) comprises interference cancellation means (31, 32, 33) for eliminating interference components in the output signal of the correlator (13),
a detector (14) for detecting information symbols on the basis of the output signal of the correlator (13) and the estimation tap coefficients,
characterized in that the interference cancellation means comprise respectively for each estimation tap coefficient:
means (31, 32) for calculating interference components, comprising: scaling means (31) for scaling the estimated tap coefficients on the basis of the number L of chips constituting one symbol of the received bitstream, and cross correlation calculation means (32) for multiplying the scaled estimated tap coefficients by a cross correlation term based on a spreading sequence and a path delay; and
means (33) for subtracting interference components from an estimated tap coefficient to generate an improved estimated tap coefficient to be supplied to the detector (14).

2. Coherent receiver according to claim 1, characterized in that
the means for calculating interference components comprise cross correlation calculation means (32).

3. Coherent receiver according to claim 2, characterized in that
the cross correlation calculation means (32) are designed for using the autocorrelation of a transmitter pulse.

4. Coherent receiver according to claim 1, characterized in that
the channel estimator (15) comprises further cancellation means for eliminating interference components in the output of the first cancellation means (31, 32, 33).

5. Coherent receiver according to claim 1, characterized in that
the detector comprises at least one RAKE receiver (15).

6. Coherent receiver according to claim 1, characterized in that
the interference cancellation means (31, 32, 33) are designed to cancel interpath interference components.

7. Coherent receiver according claim 1, characterized in that
the channel estimator (15) comprises a path searcher means (30) detecting the n strongest multipath components with an amplitude larger than a predetermined threshold, n being a preset integer.

8. Mobile telecommunications device, characterized in that
it comprises a coherent receiver according to claim 1.

9. Mobile station for a CDMA transmission system, characterized in that
it comprises a coherent receiver according to claim 1.

10. Coherent receiving method, comprising the steps of
receiving (11) a modulated bitstream,
correlating (13) the received bitstream,
estimating (15) tap coefficients on the basis of an output signal of the correlating step (13), wherein the tap coefficient estimating step (15) comprises the step (31, 32, 33) of interference cancellation for eliminating interference components in the output of the correlating step (13),
detecting (14) information symbols on the basis of the output of the correlating step (13) and the estimation tap coefficients,
characterized in that the interference cancellation step comprises, respectively for each estimation tap coefficient:
a step (31, 32) of calculating interference components by scaling (31) the estimated tap coefficients on the basis of the number L of chips constituting one symbol of the received bitstream and cross correlation multiplying (32) the scaled estimated tap coefficients by a cross correlation term based on a spreading sequence and a path delay, and
a step (33) of subtracting interference components from an estimated tap coefficient to generate an improved estimated tap coefficient to be used in the detecting step (14).

11. Coherent receiving method according to claim 10, characterized in that
the step of calculating interference components comprises a cross correlation calculation step (32).

12. Coherent receiving method according to claim 11, characterized in that
the autocorrelation of a transmitter pulse is used in the cross calculation step (32).

13. Coherent receiving method according to claim 10, characterized in that
the estimating step (15) comprises furthermore the step of eliminating interference components in the output of the first cancellation means (31, 32, 33).

14. Coherent receiving method according to claim 10, characterized in that
the detecting step comprises at least one RAKE receiving step (15).

15. Coherent receiving method according to claim 10, characterized in that
the interference cancellation step (31, 32, 33) cancels interpath interference components.

16. Coherent receiving method according to claim 10, characterized in that
the channel estimating step (15) comprises a path searching step (30) detecting the n strongest multipath components with an amplitude larger than a predetermined threshold, n being a preset integer.

17. Coherent receiving method according to claim 10, characterized in that the received bitstream is modulated according to an CDMA technique.

* * * * *